Feb. 23, 1954
T. J. WILSON
2,670,454
INSTRUMENT LANDING APPARATUS AND METHOD
Filed Sept. 17, 1949
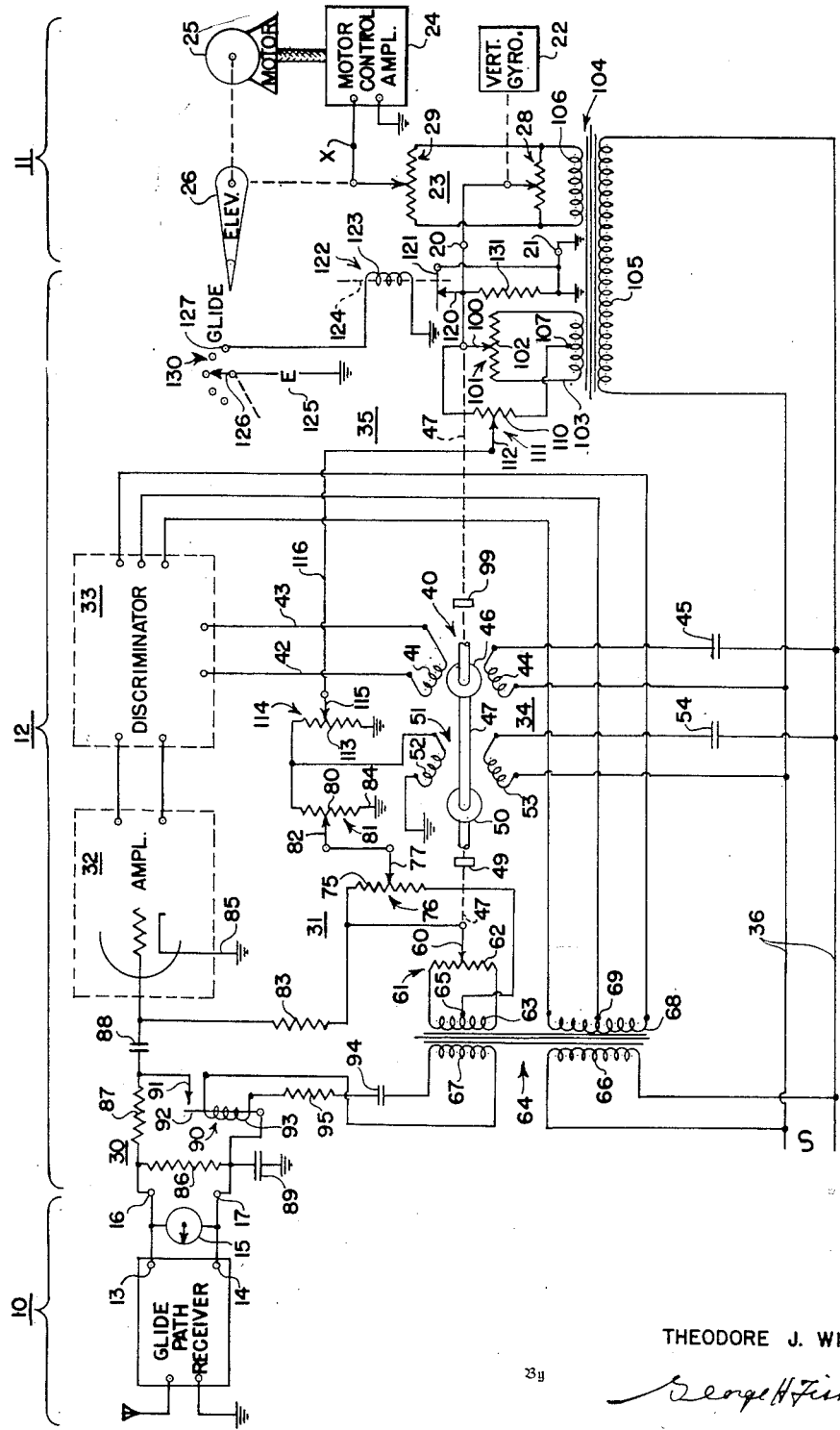
Inventor
THEODORE J. WILSON
By George H. Fisher
Attorney Patented Feb. 23, 1954

2,670,454

UNITED STATES PATENT OFFICE 2,670,454

INSTRUMENT LANDING APPARATUS AND METHOD

Theodore J. Wilson, Minneapolis, Minn., assignor to Minneapolis-Honeywell Regulator Company, Minneapolis, Minn., a corporation of Delaware Application September 17, 1949, Serial No. 116,256

9 Claims. (Cl. 318—16)

This invention relates to the field of aircraft control, and more specifically to apparatus for causing an aircraft to follow a glide path established in space by suitable radio means. Apparatus of this nature is not broadly new, but is subject to certain defects which structure described herein was designed to remedy.

Known apparatus includes means controlling the operation of the elevators or power controls of a craft in accordance with a signal which varies in magnitude and sense with the amount and direction of the deviation of the craft from the desired glide path. It has been found desirable to modify the signal, by appropriate circuit means, in accordance with its rate of change, because this results in smoother, more accurate movement of the craft without hunting about the glide path.

The modifying means just referred to have heretofore been resistance-capacitance networks, which to a degree give the desired rate response. Such a network is inherently inaccurate as a rate taking arrangement, however, and has the further disadvantage of giving undesirably large effect to sudden transient changes in the signal not due to displacement of the craft, and of having a time limitation on its operation because of the interval required for a charged capacitor to discharge.

It is accordingly an object of the invention to provide instrument landing apparatus including improved means for controlling a craft in accordance with the rate as well as the magnitude of its departure from a desired glide path.

A further object of the invention is to provide such apparatus in which the rate component is obtained without resorting to differentiating resistance-capacitance circuits, whereby insensitivity of the apparatus during the interval necessary for capacitor discharge is eliminated.

It is a further object of the invention to provide such apparatus having a motor rebalanced converter for supplying alternating control voltage proportional to a unidirectional signal voltage, the motor having a maximum speed and driving a "velocity" generator whose output varies with its speed and direction of rotation to supply the rate component, so that the latter has an upper limit independent of the magnitude of the unidirectional signal voltage.

Yet another object of the invention is to provide instrument landing apparatus for a craft having an automatic pilot for maintaining the craft in level flight, including improved means for modifying the operation of the automatic pilot in accordance with the departure of the craft from a desired glide path, and with the rate at which this departure is sensed.

Various other objects, advantages, and features of novelty which characterize the invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which there is illustrated and described a preferred embodiment of the invention.

The single figure of the drawing is a wiring diagram schematically illustrating the air-borne components of an instrument landing apparatus according to the invention. The invention is shown as embodied in the glide path portion of the complete instrument landing system; to avoid confusion the conventional localizer receiver and aileron and rudder channels of the automatic pilot have been omitted.

The principal components of the invention include a glide path receiver 10 which is connected in controlling relation to an automatic pilot 11 by a coupling unit 12. Receiver 10 is a standard unit of the well-known instrument landing system which is described in Technical Development Reports number 35 and number 36 of the Civil Aeronautics Authority, entitled "The CAA-RTCA Instrument Landing System" and published in October 1943. The receiver supplies at a pair of output terminals 13 and 14 a unidirectional voltage whose magnitude and polarity depend upon the amount and direction of the displacement of the craft from a landing beam established in space by the radio transmitter of the I. L. S. ground installation. This voltage is supplied to the horizontal needle of a cross-pointer indicator 15, and also to the input terminals 16 and 17 of coupling unit 12.

The coupling unit functions, when the system is in operation, to supply at a pair of output terminals 20 and 21 an alternating voltage, for controlling automatic pilot 11, which varies in amplitude and reverses in phase with variation in the magnitude and reversal in the polarity of the unidirectional voltage applied to input terminals 16 and 17. A coupling unit according to the prior art is shown in the copending application of Alderson et al., Serial No. 49,442, filed September 15, 1948, and assigned to the assignee of the present application.

In the drawing the elevator channel only of automatic pilot 11 is shown, and is seen to comprise a vertical gyroscope 22 which normally controls the balance condition of an elevator bridge 23 by adjusting a voltage divider 28. The output of the bridge is applied to a motor control amplifier 24 to control the energization of a servomotor 25 which actuates the elevators 26 of the craft and also rebalances bridge 23 by adjusting a voltage divider 29. The elevator channel is continued between terminals 20 and 21 by portions of coupling unit 12, to add to the bridge signal a further signal whenever the craft deviates from the desired glide path. Since the automatic pilot is constructed for operation from a source of alternating voltage, the control voltage appearing at output terminals 20 and 21 of coupling unit 12 must be an alternating voltage of the same frequency, and either of the same phase or 180 degrees out of phase therewith.

It has also been found that, due to unavoidable mechanical and electrical inertias and resonances, it is necessary to stability of the apparatus as a whole that the signal appearing at output terminals 20 and 21 be modified further than mere conversion from direct to alternating current: this also is accomplished in coupling unit 12.

The functions to be accomplished in coupling unit 12 having now been generally made known, the structure by which these functions are accomplished will be described in detail. The principal components of coupling unit 12 comprise an input network 30 and a rebalancing network 31, which together energize an amplifier 32. The output of amplifier 32 controls the operation of a discriminator 33, which controls a dynamoelectric power unit 34. Power unit 34 controls the voltage supplied by rebalancing network 31, and also the voltage supplied at terminals 20 and 21 by an output network 35. Alternating voltage is supplied to coupling unit 12, and also to automatic pilot 11, on a pair of conductors indicated by reference numeral 36.

Unit 34 comprises a reversible motor 40 energized from discriminator 33 whenever an output is supplied by amplifier 32. Motor 40 comprises an amplifier phase winding 41, connected to discriminator 33 by conductors 42 and 43 for energization with alternating voltage of reversible phase, and a line phase winding 44, energized in fixed phase relationship from conductors 36, through a quadrature capacitor 45. Windings 41 and 44 cooperate with a rotor 46 to cause rotation of a shaft 47 in one direction or the other depending on whether the energization of winding 41 leads or lags that of winding 44. The motor is of the type whose speed, for light loads such as are here present, varies directly with the energizing voltage, and to this end may be provided with a high resistance armature.

Shaft 47 actuates, through reduction gearing 49, the slider 60 of a voltage divider 61 whose winding 62 is energized from the secondary winding 63 of a transformer 64, the winding being center tapped at 65. Transformer 64 also includes a primary winding 66, continuously energized from conductors 36, and further secondary windings 67 and 68, the latter being center tapped at 69.

It will be apparent that when slider 60 is at the center of winding 62, it is at the same potential as center tap 65 of winding 63. For all other positions of slider 60, a potential difference of one phase or the other exists between slider 60 and center tap 65, and this potential difference is impressed across the winding 75 of a voltage divider 76 having a slider 77.

Shaft 47 also carries the rotor 50 of a "velocity generator" or dynamic transformer 51 having a secondary winding 52 and a primary winding 53, the latter being energized from conductors 36 through a phasing capacitor 54. Velocity generator 51 is so constructed that as long as rotor 50 is stationary, no voltage is induced in secondary winding 52 from primary winding 53, while if the rotor is in rotation a voltage is induced in secondary winding 52 which depends in phase on the direction of rotation of the rotor and in magnitude on the speed at which the rotor is moving. The output of velocity generator 51 is impressed across the winding 80 of a voltage divider 81 having a slider 82 connected to slider 77 of voltage divider 76.

A grid circuit for amplifier 32 is shown to comprise a resistor 83, the portion of winding 75 above slider 77, the portion of winding 80 below slider 82, and ground connections 84 and 85. Resistor 83 prevents the grid of amplifier 32 from being directly grounded when slider 77 is at the top of winding 75, and slider 81 is at the bottom of winding 80, while permitting the grid to take a potential determined by the positions of sliders 77 and 82.

The potential of the grid of amplifier 32 is also affected by the voltage appearing across input resistor 86, at terminals 16 and 17, the former of which is connected to the grid through a resistor 87 and a coupling capacitor 88. Terminal 17 is isolated from the grounded cathode 85 of the amplifier input stage by a blocking capacitor 89, but the capacitor presents a relatively low impedance to alternating voltages of the frequency of that appearing on conductors 36.

The unidirectional voltage impressed on input terminals 16 and 17 is made effective upon the grid of amplifier 32 by means including a vibrator 90 having a fixed contact 91, a movable contact 92, and a coil 93. Coil 93 is energized from secondary winding 67 of transformer 64 through a phasing capacitor 94 and a dropping resistor 95, and when energized causes movable contact 92 to oscillate first into and then out of engagement with fixed contact 91. When the two contacts are in engagement, the input to amplifier 32 is grounded: when the two contacts are out of engagement, the input signal is supplied to the grid of the amplifier. The input voltage for amplifier 32 is therefore essentially of square wave form, and the alternating component of this voltage is transmitted through capacitors 88 and 89 so that it appears across the input stage of amplifier 32.

It is thus evident that the input to amplifier 32 comprises the sum of two alternating voltages, supplied by the input network and the rebalancing network. These voltages are of the same frequency, since vibrator 90 and voltage divider 61 are energized from secondary windings of the same transformer; phasing capacitor 94 is provided for the purpose of insuring that the vibrator makes and breaks the connection between contacts 91 and 92 at the instants when the alternating voltage in secondary winding 63 is passed through zero. It is thus possible for the alternating component of a voltage supplied by vibrator 90 to be exactly neutralized by voltage supplied by rebalancing network 31. The effect of voltage from divider 81 in the rebalancing network is minor during normal operation of the system, so that the input voltage is actually balanced by voltage from divider 76. Thus motor 40 is energized whenever the rebalancing voltage and the input voltage are unequal, and operates in the desired direction to adjust the rebalancing voltage until it becomes equal to the input voltage again.

As is well known, the addition of voltage from the velocity generator in the rebalancing network gives the over-all apparatus anti-hunt characteristics.

Shaft 47 is also extended through reduction gearing 99 to operate the slider 100 of a voltage divider 101 having a winding 102 which is energized from a secondary winding 103 of a transformer 104 having a primary winding 105 and a further secondary winding 106: secondary winding 103 is center-tapped as at 107. So long as slider 100 is at the center of winding 102 it is at the same potential as center tap 107, but for all other positions of slider 100 a potential difference of reversible phase exists between the slider and the center tap, the phase being determined by the direction of the displacement of the slider: this potential difference is impressed across the winding 110 of a voltage divider 111 having a slider 112.

The output of velocity generator 51 is impressed across the winding 113 of a voltage divider 114 having a slider 115, the latter being connected to slider 112 of voltage divider 111 by a conductor 116. Since slider 100 of voltage divider 101 is connected to output terminal 20 of the coupling unit, and since output terminal 21 of the coupling unit is grounded, an output circuit may be traced from terminal 20 which includes the portion of winding 110 above slider 112 and the portion of winding 113 below slider 115. The output voltage of the coupler is therefore dependent upon the position of slider 100 and the speed of rotation of rotor 50.

Control of the elevators of the craft from the glide path receiver is not desired except during the final portion of an instrument landing. For all other conditions the output terminals are short-circuited by means including the fixed contact 20 and the moveable contact 121 of a relay 122 having an energizing coil 123 which actuates moveable contact 121 through a suitable armature 124. Relay 122 is energized from a suitable source of electrical energy 125 through means such as the movable contact 126 and a fixed contact 127 of the manually actuated tap switch 130, when the latter is in a "glide" position. In all other positions of switch 130 relay 123 is deenergized, thus completing a direct connection between terminals 20 and 21 and thus in turn completing the input circuit to motor control output 24. A resistor 131 is connected between terminals 120 and 121 so that, even should satisfactory contact not be made between movable contact 121 and fixed contact 120, the circuit for the motor control output will still be completed, and improper operation of the motor upon relay failure for example will be thus averted.

It has been found desirable to provide means for preventing the output of velocity generator 51 from ever exceeding a desired maximum value. This is accomplished by arranging circuit parameters in the amplifier and discriminator so that motor 40 is fully energized when voltage of a selected amplitude is impressed upon the input to the amplifier. Further increase in the input voltage is thereafter incapable of causing any greater speed of operation of motor 40, and the output of velocity generator 51 is thus limited.

The maximum output voltage appearing at terminals 13 and 14 in glide path receiver 10 is determined by the air speed of the moving craft and the angle and distance from the transmitter at which it crosses the beam. By suitably selecting the ratios of gear reducers 49 and 99, the speed of motor 40 may be adjusted so that the voltage between slider 60 and center tap 65 can change at generally the same rate. This insures that the coupling unit is capable of following any significant change in the output from the glide path receivers, while following no erratic and rapid transient in the output not due to change in the position of the craft relative to the beam. It also means, as mentioned above, that under all normal conditions the rate of operation of motor 40 is not only the rate at which departure from the glide path is sensed by the coupling unit, but also the rate at which the departure actually takes place. The output of the velocity generator may be also considered the first derivative of the displacement of the craft from the glide path, and is more exactly so than any component introduced by the resistance-capacitance circuits in coupling units known in the prior art.

It will be appreciated that the showing of automatic pilot 11 is extremely schematic, and that in practice this component would be considerably refined by the insertion at point X for example, of such further voltages as are considered desirable for most satisfactory operation of the apparatus.

The following values are suitable for use in the structure illustrated:

| | |
|---|---|
| Conductors 36 | 110 voltage, 400 cycle, 1 phase A. C. |
| Secondary 63 output | 10 volts A. C. |
| Secondary 67 output | 40 volts A. C. |
| Secondary 68 output | 700 volts A. C. |
| Secondary 103 output | 10 volts A. C. |
| Secondary 106 output | 30 volts A. C. |
| Resistor 28 | 890 ohms |
| Resistor 29 | 1500 ohms |
| Resistor 62 | 650 ohms |
| Resistor 75 | 1000 ohms |
| Resistor 80 | 2000 ohms |
| Resistor 83 | 500,000 ohms |
| Resistor 84 | 470,000 ohms |
| Resistor 86 | 1000 ohms |
| Resistor 87 | 75,000 ohms |
| Resistor 95 | 500 ohms |
| Resistor 102 | 650 ohms |
| Resistor 110 | 1000 ohms |
| Resistor 113 | 2000 ohms |
| Resistor 131 | 50,000 ohms |
| Capacitor 45 | .25 microfarad |
| Capacitor 54 | .25 microfarad |
| Capacitor 88 | .05 microfarad |
| Capacitor 89 | .05 microfarad |
| Capacitor 94 | .25 microfarad |

*Operation*

The normal operation of the automatic pilot will first be considered. When the craft is in normal flight, vertical gyroscope 22 detects any change in the pitch attitude of the craft from that which is desired, and bridge 23 is unbalanced. Motor control amplifier 24 causes operation of servomotor 25 to adjust the position of elevators 26 to change the pitch attitude of the craft, and at the same time rebalances the bridge circuit, which is completed between terminals 20 and 21 by contacts 120 and 121 of relay 122.

Normal instrument landing procedure brings the craft onto a proper heading to follow the localizer beam, the direction of which is the same as that of the glide path beam. The latter beam is normally entered from below, so that in watching cross pointer indicator 15 the human pilot observes the horizontal needle rise until it contacts the upper stop, and then returns to a central position as the center of the glide path is approached. The voltage causing the displacement of the horizontal needle also appears between terminals 16 and 17 and is converted to a square wave by operation of vibrator 99, the alternating component of the square wave being impressed on the input to amplifier 32. Unless an equal and opposite voltage is being supplied from secondary winding 63 of transformer 64, amplifier 32 provides an output voltage to discriminator 33, and the motor 40 is energized. This displaces slider 60 along winding 62 to change the rebalancing voltage on amplifier 32, and at the same time displaces slider 100 along winding 102 to change the output voltage to be supplied from secondary winding 103. At the same velocity generator 51 is driven to supply a first voltage in the input circuit to amplifier 32, and a second voltage in the output from the coupling unit.

As the craft reaches the center of the glide path beam, the voltage impressed on input terminals 16 and 17 becomes zero, slider 60 is at the center of the winding 62, and slider 100 is at the center of 102. The only voltage in either the input circuit to the amplifier or the output circuit from the coupling unit is that due to velocity generator 51. The human pilot now actuates switch 130 into its "glide" position, so that this latter voltage, normally very small under these conditions, is added in the automatic pilot.

If the flight of the craft continues in the same direction, it moves into a space in the "high" side of the glide path. The horizontal pointer of meter 15 moves downwardly from the central zero position, an input voltage is impressed on amplifier 32, and motor 40 is energized, adjusting sliders 60 and 100 to rebalance the amplifier and to supply output voltage for correcting the position of the elevators by means of the automatic pilot. This latter voltage has a rate component, due to the operation of velocity generator 51, of the proper magnitude to bring about stable operation of the apparatus as a whole: the magnitude of this component may be given any desired value by adjustment of slider 115. The craft quickly takes a new pitch attitude such as will cause it to follow the glide path down to the touchdown point.

It will thus be apparent that the invention comprises means for causing a craft, normally stabilized for level flight, to follow an inclined glide path in a stable fashion. The structure includes a velocity generator for supplying to the output of the coupling unit a component varying with the rate of change of the displacement of the craft from the center of the beam, and this component is free from the lags and imperfections present when such components are attempted to be added by the use of resistance-capacitance networks.

Numerous objects and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

I claim as my invention:

1. In aircraft control apparatus, in combination: a source of unidirectional voltage; a source of alternating voltage; means energized with said alternating voltage for deriving from said unidirectional voltage an alternating signal voltage whose amplitude depends on the magnitude of the unidirectional voltage and whose phase reverses with reversal in the polarity of the unidirectional voltage; a reversible motor; motor control means controlling the operation of said motor in accordance with said signal voltage; voltage varying means energized with said alternating voltage from said source and actuated by said motor; means opposing said signal voltage with voltage from said varying means, to interrupt operation of said motor; a velocity generator driven by said motor to give an output which varies with the speed of said motor; an automatic pilot including means for positioning the elevators of a craft in response to a signal; and means combining the outputs from said voltage varying means and said velocity generator and supplying the combination as a signal to said elevator positioning means.

2. In a device of the class described, in combination: a source of unidirectional voltage; a source of alternating voltage; means energized with said alternating voltage for deriving from said unidirectional voltage an alternating signal voltage whose amplitude depends on the magnitude of the unidirectional voltage and whose phase reverses with reversal in the polarity of the unidirectional voltage; a reversible motor; motor control means controlling the operation of said motor in accordance with said signal voltage; voltage varying means energized with said alternating voltage from said source and actuated by said motor; means opposing said signal voltage with voltage from said varying means, to interrupt operation of said motor; a velocity generator driven by said motor to give an output which varies with the speed of said motor; and means combining the outputs from said voltage varying means and said velocity generator to comprise a control signal.

3. Apparatus of the class described comprising, in combination: a source of signal voltage; a source of balancing voltage; a source of output voltage; motor means for simultaneously adjusting said balancing voltage and said output voltage; means giving a control voltage in accordance with the angular velocity of said motor; means energizing said motor for operation in accordance with the difference between said signal voltage and said balancing voltage, so as to reduce the magnitude of said difference; means modifying said difference in accordance with said control voltage, to stabilize the operation of said motor; means modifying said output voltage in accordance with said control voltage; and means actuated in accordance with said modified output voltage.

4. Aircraft control apparatus comprising, in combination: means supplying a signal voltage whose sense and magnitude are determined by the direction and amount of displacement of a craft from a selected glide path; means adjustable to supply a sense reversing variable balancing voltage and a sense reversing variable output voltage; motor means for simultaneously adjusting said balancing voltage and said output voltage at a speed which varies, up to a limiting value, with the voltage applied thereto, and in a sense determined by the sense of said applied voltage; means supplying a control voltage in accordance with the angular velocity of said motor; motor control means applying to said motor a voltage determined in sense and magnitude by the difference between said signal voltage and said balancing voltage, to cause operation of said motor at a speed and in a direction determined by said difference; means modifying said difference in accordance with said control voltage, to minimize hunting of said motor; means normally controlling the elevators of the craft, so as to maintain level flight thereof; and means modifying the operation of said last named means, in accordance with said output voltage and said control voltage, so as to cause the craft to depart from level flight and follow the selected path.

5. Apparatus of the class described comprising, in combination: a balanceable signal network; a balanceable control network; means unbalancing said signal network in accordance with a condition; means including a motor for rebalancing said signal network, and unbalancing said control network, at a rate determined by the amount of unbalance of said signal network; motor control means controlling the operation of said motor; further means rebalancing said control network and operating a control member to change said condition; generating means driven by said motor means to give an output determined by the angular velocity of said motor means; means modifying the operation of said motor control means in accordance with the output of said generating means, to minimize hunting of said motor means; and means modifying the operation of said further means in accordance with the output of said generating means, to stabilize the operation of the apparatus as a whole.

6. Aircraft control apparatus comprising, in combination: a first balanceable network; means unbalancing said first network in accordance with departure of a craft from a selected glide path; a second balanceable network; motor means rebalancing said first network, and unbalancing said second network, at a speed determined by the voltage applied thereto and in a sense determined by the sense of said applied voltage; motor control means applying to said motor means a voltage determined in a sense and magnitude by the unbalance of said first network; elevator control means rebalancing said second network and adjusting the elevators of the craft, to cause the craft to return toward the selected glide path; generating means driven by said motor means to give an output determined by the angular velocity of said motor means; means modifying the operation of said motor control means in accordance with the output of said generating means, to minimize hunting of said motor means; and means modifying the operation of said elevator control means in accordance with the output of said generating means, so that the elevators of the craft are controlled in accordance with the departure of the craft from the glide path and with the first derivative of said departure.

7. In aircraft control apparatus, in combination: an automatic pilot including means for positioning the elevators of a craft in accordance with electrical signals; a radio receiver for giving an output which varies in magnitude, sense, and rate of change with vertical departure of the craft from a selected path; and a coupling unit, for regulating said automatic pilot in accordance with the output of said receiver, said coupling unit comprising a source of voltage suitable for supplying signals to said elevator positioning means, motor means for adjusting the voltage supplied by said source in accordance with the energization of said motor means to give an electrical signal; means energizing said motor means in accordance with the output of said receiver only as long as said output remains within predetermined limits, so that the speed of said motor means varies within limits in accordance with said output; means modifying said electrical signal in accordance with the speed of said motor means, and means supplying the signal so modified to said elevator positioning means.

8. In aircraft control apparatus, in combination: an automatic pilot including means for positioning the elevators of a craft in accordance with electrical signals; a radio receiver for giving an output which varies in magnitude, sense, and rate of change with vertical departure of the craft from a selected path; and a coupling unit, for regulating said automatic pilot in accordance with the output of said receiver, said coupling unit comprising a source of voltage suitable for supplying signals to said elevator positioning means, motor means for adjusting the voltage supplied by said source in accordance with the energization of said motor means to give an electrical signal, means energizing said motor means in accordance with the output of said receiver, so that the speed of said motor means varies in accordance with said output, means modifying said electrical signal in accordance with the speed of said motor means, and means supplying the signal so modified to said elevator positioning means.

9. In a device of the class described, in combination: a source of unidirectional voltage; a source of alternating voltage; means energized with said alternating voltage for deriving from said unidirectional voltage an alternating signal voltage whose amplitude depends on the magnitude of the unidirectional voltage and whose phase reverses with reversal in the polarity of the unidirectional voltage; a reversible motor; motor control means controlling the operation of said motor in accordance with said signal voltage; voltage varying means energized with said alternating voltage from said source and actuated by said motor; a generator driven by said motor to give an output which varies with the speed of said motor; and means combining the outputs from said voltage varying means and said generator to comprise a control signal.

THEODORE J. WILSON.

References Cited in the file of this patent

UNITED STATES PATENTS

| Number | Name | Date |
|---|---|---|
| 1,800,328 | Sundhaussen | Apr. 14, 1931 |
| 1,988,458 | Minorsky | Jan. 22, 1935 |
| 2,372,185 | Wittkuhns | Mar. 27, 1945 |
| 2,419,970 | Roe et al. | May 6, 1947 |
| 2,423,337 | Moseley | July 1, 1947 |
| 2,452,609 | Somers et al. | Nov. 2, 1948 |
| 2,466,534 | Cole | Apr. 5, 1949 |
| 2,496,294 | Kellogg 2nd | Feb. 7, 1950 |
| 2,613,339 | Palmer | Oct. 7, 1952 |
| 2,623,715 | Newton | Dec. 30, 1952 |
| 2,630,282 | Halpert | Mar. 3, 1953 |

FOREIGN PATENTS

| Number | Country | Date |
|---|---|---|
| 449,886 | Germany | Sept. 28, 1927 |